United States Patent
De Cesare et al.

(10) Patent No.: US 10,609,478 B2
(45) Date of Patent: Mar. 31, 2020

(54) DEVICE FOR THE ACQUISITION AND CONDITIONING OF AN ACOUSTIC SIGNAL GENERATED BY A SOURCE OF AN INTERNAL COMBUSTION ENGINE

(71) Applicant: MAGNETI MARELLI S.p.A., Corbetta (IT)

(72) Inventors: Matteo De Cesare, Torremaggiore (IT); Federico Covassin, Bologna (IT); Antonio Barbuto, Bologna (IT); Federico Monti, Bologna (IT)

(73) Assignee: MAGNETI MARELLI S.p.A., Corbetta (IT)

( * ) Notice: Subject to any disclaimer, the term of this patent is extended or adjusted under 35 U.S.C. 154(b) by 0 days.

(21) Appl. No.: 15/387,949

(22) Filed: Dec. 22, 2016

(65) Prior Publication Data
US 2017/0188143 A1 Jun. 29, 2017

(30) Foreign Application Priority Data
Dec. 23, 2015 (IT) .................. 102015000087484

(51) Int. Cl.
*H04R 3/00* (2006.01)
*G01H 3/12* (2006.01)
(Continued)

(52) U.S. Cl.
CPC ......... *H04R 3/005* (2013.01); *F02D 41/0007* (2013.01); *G01H 3/125* (2013.01);
(Continued)

(58) Field of Classification Search
CPC ............... H04R 3/005; H04R 2430/20; H04R 2499/13; F02D 41/0007; F02D 2041/288;
(Continued)

(56) References Cited

U.S. PATENT DOCUMENTS 5,170,433 A 12/1992 Elliott et al.
5,828,760 A * 10/1998 Jacobson ............. G10K 11/178
381/71.11
(Continued)

FOREIGN PATENT DOCUMENTS

EP 1843024 A1 10/2007
WO 2008042884 A1 4/2008

OTHER PUBLICATIONS

Communication dated May 19, 2017 enclosing the Extended European Search Report dated May 12, 2017 for European Patent Application No. 16206080 (9 pages).
(Continued)

*Primary Examiner* — Paul Kim
*Assistant Examiner* — Con P Tran
(74) *Attorney, Agent, or Firm* — Howard & Howard Attorneys PLLC

(57) ABSTRACT

A device for the acquisition and conditioning of a sound signal generated by a source of an internal combustion engine and comprising a box-shaped support body having a first measuring assembly and a second measuring assembly; wherein the first measuring assembly is provided with at least two first microphones which lie on a first plane and are configured for the detection of a first acoustic signal generated by the source along a first provenance direction; and wherein the second measuring assembly is provided with at least a second microphone arranged on a second plane
(Continued)

configured for the detection of a second acoustic signal generated by the source along a second provenance direction different from the first provenance direction.

8 Claims, 4 Drawing Sheets

(51) Int. Cl.
    *F02D 41/28*     (2006.01)
    *F02D 41/00*     (2006.01)
    *G01M 15/12*     (2006.01)

(52) U.S. Cl.
    CPC ....... *G01M 15/12* (2013.01); *F02D 2041/288* (2013.01); *F02D 2200/025* (2013.01); *H04R 2430/20* (2013.01); *H04R 2499/13* (2013.01); *Y02T 10/144* (2013.01)

(58) Field of Classification Search
    CPC .. F02D 2200/025; G01H 3/125; G01M 15/12; Y02T 10/144
    USPC ... 381/97, 365, 361, 355, 150, 122, 91, 356, 381/92, 98, 99
    See application file for complete search history.

(56) References Cited

U.S. PATENT DOCUMENTS

2003/0033148 A1*   2/2003   Silverman ............... G10L 15/20
                                                                         704/270
2005/0226435 A1*  10/2005   Steer .................. G10K 11/1788
                                                                         381/71.7
2012/0169826 A1    7/2012   Jeong et al.

OTHER PUBLICATIONS

Italian Search Report dated Sep. 27, 2016 for Italian Patent Application No. UB20159630.

Li, Huibin, et al., "Experimental Study on the Noise Identification of the Turbocharger," Advances in Computer, Communication, Control and Automation, Lecture Notes in Electrical Engineering (LNEE), Yanwen Wu, ed., vol. 121, pp. 1-7 (2011).

Tiikoja, Heiki, et al., "Investigations of Automotive Turbocharger Acoustics," SAE International Journal of Engines, vol. 4, No. 2, pp. 2531-2542 (Jun. 15, 2011).

* cited by examiner

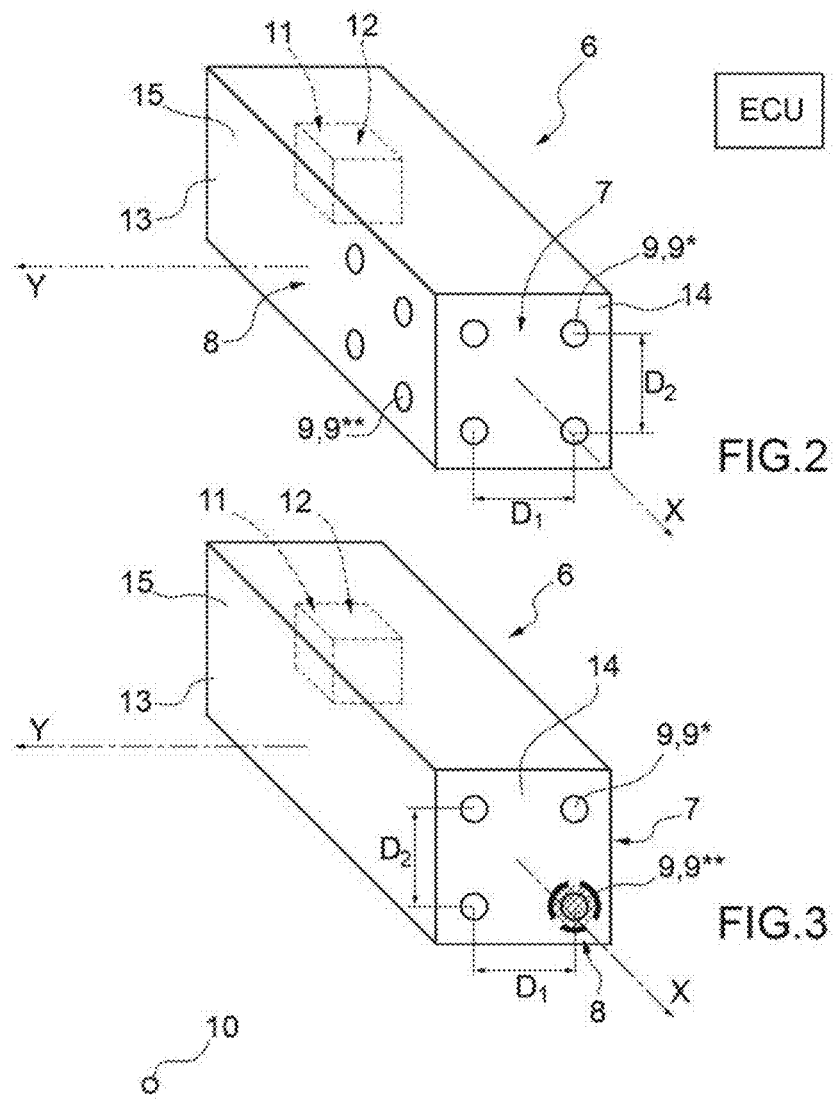
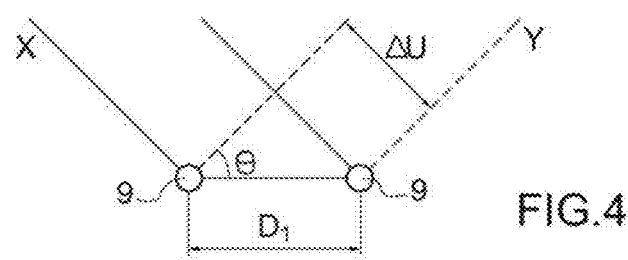

DEVICE FOR THE ACQUISITION AND CONDITIONING OF AN ACOUSTIC SIGNAL GENERATED BY A SOURCE OF AN INTERNAL COMBUSTION ENGINE

The present invention relates to a device for the acquisition and conditioning of an acoustic signal generated by a source arranged in the engine compartment of a vehicle.

BACKGROUND OF THE INVENTION

In the automotive field, the use of sensors such as microphones and/or accelerometers is known for the acquisition of signals generated by a source inside the engine compartment which are then suitably processed by specific algorithms to obtain information concerning the components arranged in the engine compartment, such as for example the rotational speed of the turbocharger, the occurrence of knocking phenomena, ignition failure phenomena, the engine load, the closing of the intake and/or exhaust valves, etc.

Typically, the sensors are installed directly onto the electronic control unit of the internal combustion engine or are housed on a measuring device provided with a processing unit (a microcontroller) for the signal, which is in turn connected to the electronic control unit of the internal combustion engine.

For example, the document EP-A1-1843024 describes a method for controlling an internal combustion engine comprising an engine block containing rotatable members and a control unit that is physically separated from the engine block and provided with a number of sensors, which are arranged to detect the intensity of the pressure waves generated by the internal combustion engine. The control unit is configured to determine, depending on the intensity of the pressure waves detected by the sensors, the value of at least one operating parameter of the engine such as, for example, the speed of the rotatable members or the occurrence of knocking phenomena inside the cylinders.

A solution of the above type, however, has some disadvantages. In particular, the application of the sensor directly onto the control unit of the internal combustion engine is limiting from the positioning flexibility point of view, because of the constraints imposed by the size of the electronic control unit. In addition, these solutions have considerable costs, which are related to the signal processing electronic components, which are provided on the measuring device itself.

SUMMARY OF THE INVENTION

Therefore, the object of the present invention is to provide a device for the acquisition and conditioning of an acoustic signal generated by a source arranged in the engine compartment of a vehicle, which is free from the drawbacks of the state of the art and which is easy and inexpensive to manufacture.

According to the present invention, a device for the acquisition and conditioning of an acoustic signal generated by a source arranged in the engine compartment of a vehicle is provided, as claimed in the appended claims.

BRIEF DESCRIPTION OF THE DRAWINGS

The present invention will now be described with reference to the accompanying drawings, which illustrate a non-limiting embodiment thereof, in which:

FIG. 2 is a schematic and perspective view of a first embodiment of the device in FIG. 1;

FIG. 3 is a schematic and perspective view of a second embodiment of the device in FIG. 1;

FIG. 4 is a diagram that illustrates the principle of directionality used by the device in FIGS. 2 and 3.

DETAILED DESCRIPTION OF THE INVENTION

Figure 1:
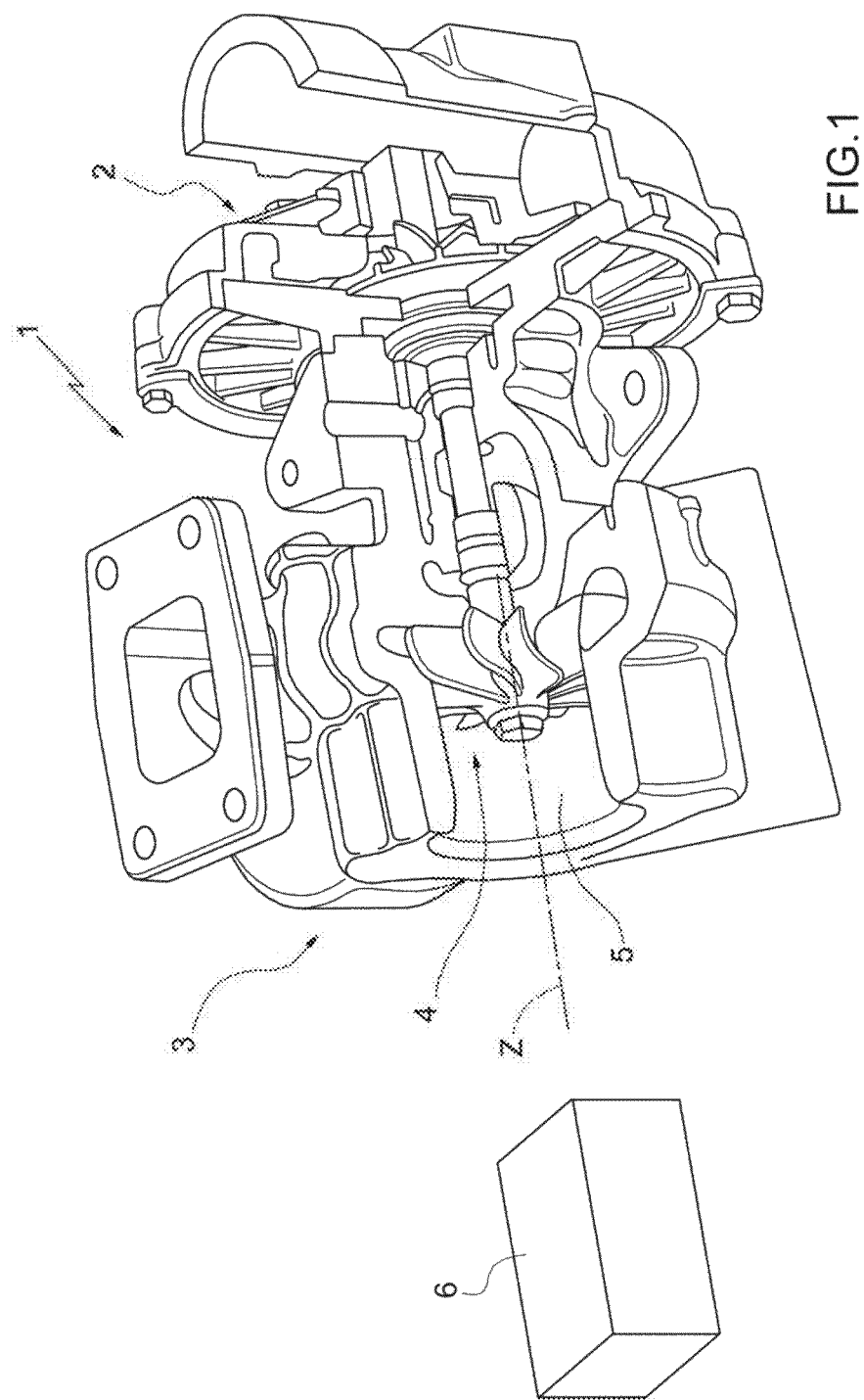
FIG. 1 is a schematic view of a turbocharger for an internal combustion engine, which is facing a device for the acquisition and conditioning of an acoustic signal manufactured according to the present invention.

In FIG. 1, the numeral 1 indicates an internal combustion engine housed in the engine compartment of a vehicle and comprising a turbocharger 1*. The turbocharger 1* is, in turn, provided with a turbine 2 and a compressor 3 provided with a bladed disc 4 rotatable around a rotation axis Z, and a fixed diffuser 5. As is known, the compressor 3 is arranged along an intake duct (not shown), while the turbine 2 is arranged along an exhaust duct (not shown). The turbine 2 and the compressor 3 are connected together mechanically; in this way, the exhaust gases discharged from the cylinders (not shown) make the turbine 2 rotate at high speed, which drives the compressor 3 into rotation, so as to increase the pressure of the air fed into the intake duct.

A device 6 is housed inside the engine compartment for the acquisition and conditioning of a sound signal S from which functional information on the turbocharger 1*, such as for example the rotational speed of the bladed disc 4, can be derived. According to a preferred variant, the device 6 for the acquisition and conditioning of a sound signal S is arranged in a position facing and next to the turbocharger 1*. According to a further variant, the device 6 for the acquisition and conditioning of a sound signal S is housed in any position of the engine compartment.

As shown more clearly in FIGS. 2 to 4, the device 6 for the acquisition and conditioning of a sound signal comprises two measuring assemblies 7, 8, each of which is provided with respective microphones 9 configured to acquire the sound signal S along respective provenance directions X and Y. In other words, the two measuring assemblies 7, 8 are adapted to acquire the sound signal S along two provenance directions X and Y, which are different from one another.

In particular, the measuring assembly 7 is constructed so as to detect the sound signal S in the provenance direction X and is provided with at least two microphones 9* oriented towards a source 10 of interest, such as for example the bladed disk 4 of the turbocharger 1*. Instead, the measuring assembly 8 is constructed so as to detect the sound signal S in the provenance direction Y and is provided with at least one microphone 9 which is not oriented towards the source 10 of interest. The microphone 9 is preferably oriented towards the surrounding environment to detect the ambient noise.

In the description that follows, S denotes the sound signal detected in general by the device 6 and generated by the source 10 of interest, $S_X$ the signal detected along the provenance direction X generated by the source 10 of interest and $S_Y$ the signal detected along the provenance direction Y generated by the source 10 of interest.

Figure 5A:
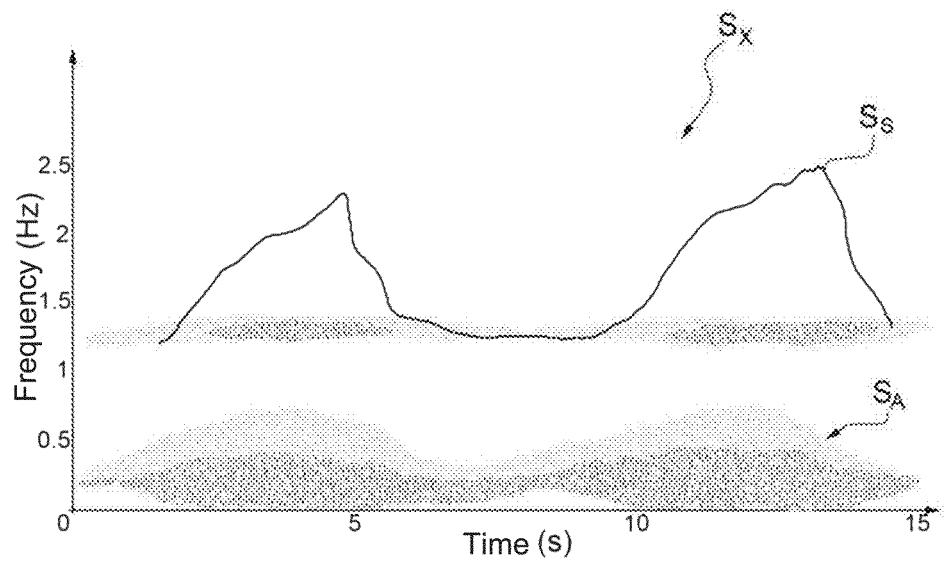
FIGS. 5a-5c are diagrams, in particular, spectrograms, which illustrate the acoustic signals acquired by the acquisition and conditioning device in figures from 2 to 4.

The measuring assembly 7 is oriented towards the source 10 (i.e. is oriented along the provenance direction X) and detects the signal $S_X$ whose rate is shown in FIG. 5a. As shown in the spectrogram, the signal $S_X$ comprises both a high-frequency signal $S_S$ emitted by the source 10 and a signal $S_A$ generated by the surrounding environment (i.e. the so-called ambient noise) at medium-low frequencies.

Figure 5B:
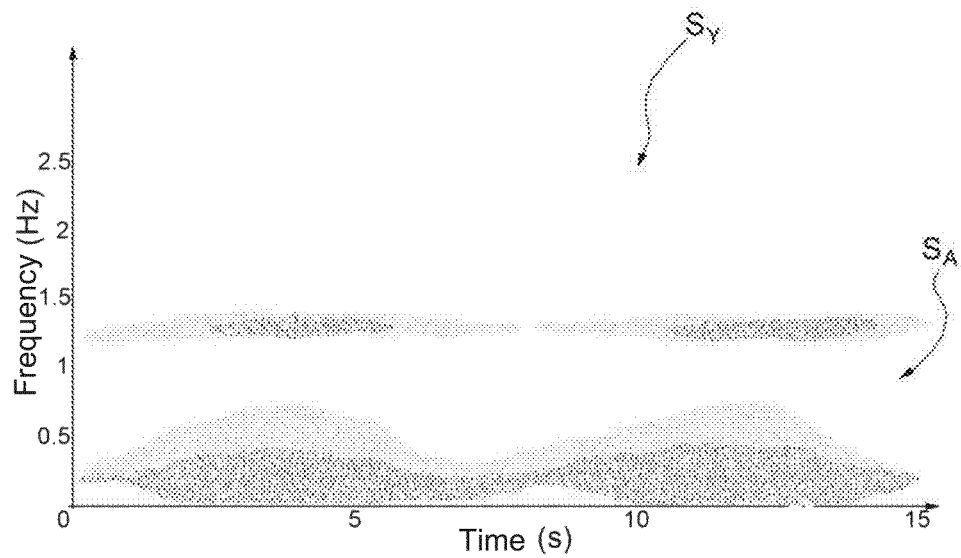
Figure 5C:
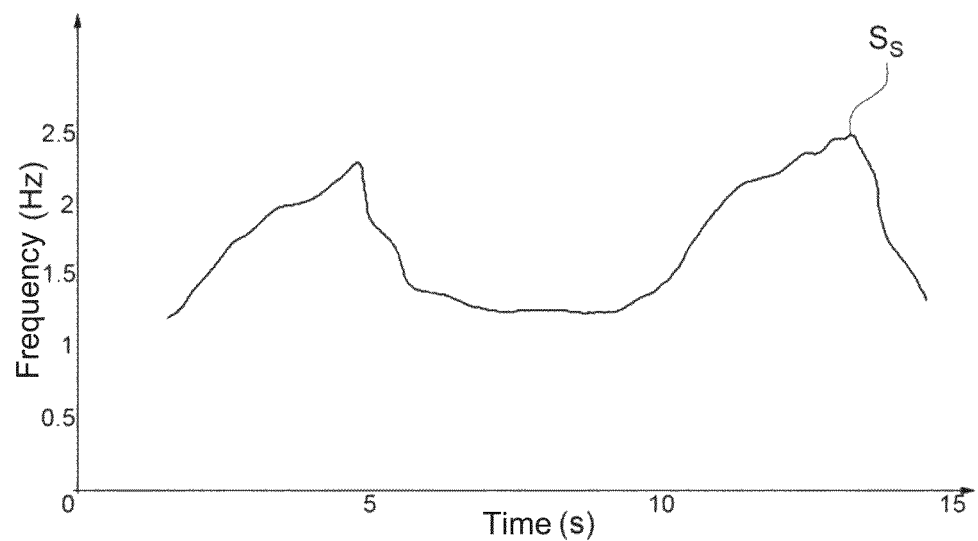

Instead, the measuring assembly 8 is oriented towards the surrounding environment (i.e. is oriented along the provenance direction Y) and detects the signal $S_Y$ whose rate is shown in FIG. 5b. As shown in the spectrogram, the signal $S_Y$ only comprises the signal $S_A$ emitted by the surrounding environment (i.e. only the ambient noise) at medium-low frequencies and is not affected by the signal $S_s$ emitted by the source 10. The signal detected by the measuring assembly 8 is used to subtract the ambient noise from the signal detected by the measuring assembly 7.

The acquired signals $S_X$, $S_Y$ are transmitted to a conditioning circuit 11 and to an anti-aliasing filter 12. Specifically, the conditioning circuit 11 is constructed so as to remove a continuous frequency f in the acquired signals $S_X$, $S_Y$ and carry out at least one amplification stage. Whereas the anti-aliasing filter 12 is configured to filter frequencies f higher than half of a sampling frequency $f_c$.

FIGS. 2 and 3 show a device 6 for the acquisition and conditioning which comprises a box-shaped support body 13 that is configured to house the two measuring assemblies 7, 8, the conditioning circuit 11 and the anti-aliasing filter 12. In the preferred embodiment, the support body 13 has a substantially parallelepiped shape.

According to a first embodiment shown in FIG. 2, the support body 13 has the measuring assembly 7 in the area of a front wall 14 and the measuring assembly 8 in the area of a side wall 15, arranged orthogonal to the front wall 14. In other words, the measuring assembly 7 is formed in the area of the front wall 14 that is arranged orthogonal to the provenance direction X; whereas the measuring assembly 8 is formed in the area of the side wall 15 that is arranged orthogonal to the provenance direction Y. In this case, the provenance direction X is orthogonal to the provenance direction Y.

In this embodiment, the measuring assembly 7 comprises, respectively, at least two microphones 9*, in particular four microphones 9* arranged in two rows and two columns and equally spaced from one another. Similarly, the measuring assembly 8 comprises, respectively, at least one microphone 9, in particular four microphones 9**** arranged in two rows and two columns and equally spaced from one another.

According to a second embodiment, shown in FIG. 3, the support body 13 has both the measuring assembly 7 and the measuring assembly 8 in the area of the front wall 14.

In this embodiment, the measuring assembly 7 comprises three microphones 9*, while the measuring assembly 8 is formed with a single microphone 9. The four microphones 9 are arranged in two rows and two columns and are equally spaced from one another. The measuring assembly 8 is obtained by screening a microphone 9. In this way, despite being arranged with the same orientation of the microphones 9*, the microphone 9**** will not be able to detect the signal $S_X$ in the provenance direction X (being screened along said provenance direction X) and can only acquire the signal $S_Y$ along the provenance direction Y.

In other words, in this embodiment, the detection assemblies 7, 8 are arranged in the area of the same front wall 14 of the support body 13 which is arranged orthogonal to the provenance direction X, but at least one of the microphones 9 is screened in such a way as to define the measuring assembly 8.

It is evident that further variations are possible, in which the measuring assembly 7 comprises two aligned microphones 9*, while the measuring assembly 8 is formed with a single microphone 9**.

For instance, according to a further variant, the support body 13 has the measuring assembly 7 in the area of a front wall 14 and the measuring assembly 8 in the area of a rear wall, parallel to the front wall 14. In other words, the measuring assembly 7 is formed in the area of the front wall 14 that is arranged orthogonal to the provenance direction X; whereas the measuring assembly 8 is formed in the area of the rear wall. In this case, the provenance direction X is parallel but opposite with respect to the provenance direction Y.

The microphones 9 that are aligned in the same row are arranged relative to one another at a predetermined distance $D_1$; whereas, the microphones 9 which overlap along the same column are arranged relative to one another at a predetermined distance $D_2$. The distances $D_1$ and $D_2$ are calculated as better described in the description that follows.

It is clear that the microphones 9 can be arranged in any layout in which the provenance direction X is different from the provenance direction Y.

The acquisition and conditioning device 6 exploits the principle of directionality of the sound signals S, which is based on the delay of reception by different microphones 9 of the sound signal S generated by the single source 10.

In particular, as shown in FIG. 4, the sound signal S emitted by the source 10 is detected both by the microphone 9' and the microphone 9", which are sampled and processed to give rise to a finite sequence of L samples, i.e. a discrete-time signal. This finite sequence of L samples, i.e. the discrete-time signal, is then processed by means of an algorithm known as Discrete Fourier Transform (DFT). The Discrete Fourier Transforms DFT provide a sampled version of the spectrum of the sound signals detected both by the microphone 9' and the microphone 9", i.e. they return the values in terms of modulus (i.e. amplitude) and phase (i.e. position) that are assumed by the spectrum of the sound signals detected both by the microphone 9' and the microphone 9" at certain equally spaced frequencies. In yet other words, the Discrete Fourier Transform DFT is a frequency sampling of the spectrum of the sound signals detected both by the microphone 9' and the microphone 9".

Two vectors, each of which comprises an L number of elements (also called bin) contain information relating to the frequency sampling of the spectrum of the sound signals detected, respectively, both by the microphone 9' and the microphone 9". In other words, a bin represents the discretization step of the Discrete Fourier Transform DFT. The L number of bins is suitably selected so as to meet both the requirements of speed and accuracy of the response and represents the discretization step of the Discrete Fourier Transform DFT. The information content of each of the L bins is equal to the ratio $f_S/L$ where L represents the number of bins and $f_S$ represents the sampling frequency. According to the well-known Nyquist-Shannon sampling theorem, on the one hand, the sampling frequency fs must be at least twice the frequency of the phenomenon to be observed; on the other hand, at the same time, it is necessary to avoid increasing excessively the computational burden for the electronic control unit ECU.

The Discrete Fourier Transforms DFT synchronously calculated for each microphone 9', 9" are processed by a suitable algorithm to take into account the different positions of the microphones 9', 9" and generate a kind of virtual sensor for each of the measuring assemblies denoted by 7 and 8. The processing of the Discrete Fourier Transforms DFT synchronously calculated for each microphone 9', 9" can consist in summing the signals detected by the different microphones 9', 9", so that any noises on a microphone 9', 9" are compensated by the data coming from the other microphone 9', 9"; or, alternatively, it is possible to correct the phase signals detected by the different microphones 9', 9" by calculating the delay (i.e. as a function of the relative distances between the microphones 9', 9" and of the position of the source 10 of interest).

However, the sound pressure wave generated by the source 10 is not received simultaneously by the two microphones 9' and 9"; the microphone 9" detects the sound signal S with a certain delay with respect to the microphone 9' due to the additional distance Au that must be travelled by the sound pressure wave. This time delay in the domain of the Fourier transforms results in a phase shift equal to $e^{-i2\pi f\tau}$. Where f is the frequency of the incident wave and the quantity $\tau$ is equal to $(d/c)\sin(\theta)$, where c is the speed of sound, d is the distance between the two aligned microphones 9', 9" (i.e. the distance $D_1$) and $\theta$ is the angle of incidence between the plane defined by the microphones 9 and the directrix of the source 10. By varying the angle of incidence $\theta$, the direction of detection of the sound signal S is varied.

If the frequency f of the incident wave exceeds a threshold level $f_{TV}$, a phase shift greater than $2\pi$ is obtained, which generates the sound signal S distortion phenomenon known as aliasing.

In order to apply directionality algorithms without incurring the aliasing phenomenon, the following inequality must then prove correct:

$$d < \frac{\lambda}{2} = \frac{c}{2f} \quad [2]$$

where f is the frequency of the incident wave, c is the speed of sound and $\lambda$ is the wavelength. The above inequality must prove correct both for the distance $D_1$ and the distance $D_2$ introduced previously, which are therefore a function of the wavelength of the acquired sound signal S.

According to a third embodiment, not shown, the device is provided with a further measuring assembly equipped with at least one microphone 9**. In particular, the measuring assembly 16 is adapted to acquire the sound signal S along a third direction, different with respect to the directions X and Y, so as to obtain a spatial directivity.

In the foregoing description, reference was explicitly made to the processing of the sound signal S generated by rotation of the bladed disk 4 of the turbocharger 1*, but the device 6 for the acquisition and conditioning can be used for the processing of the sound signal S generated by any component arranged in the engine compartment.

It is to be understood that, depending on the phenomena to be measured or monitored, it is possible to arrange special filtering chains that allow for isolating the components at different frequencies typical of related phenomena.

The device 6 for the acquisition and conditioning of the sound signal S described hitherto has a few advantages. In particular, the device 6 is compact, has a high flexibility of positioning inside the engine compartment, and is compatible with any electronic processing unit ECU present on board the vehicle.

The invention claimed is:

1. A device for the acquisition and conditioning of a sound signal (S) generated by a source of an internal combustion engine comprising: a box-shaped support body having a first measuring assembly and a second measuring assembly; wherein the box-shaped support body is spaced from and does not surround the source; wherein the first measuring assembly is provided with at least two first microphones which lie on a first plane defined by a first wall of the box-shaped support body and detect a first acoustic signal ($S_X$) generated by the source along a first provenance direction (X); and wherein the second measuring assembly is provided with at least a second microphone arranged on a second plane defined by a second wall of the box-shaped support body and that detects a second acoustic signal ($S_Y$) generated by the source along a second provenance direction (Y) different from the first provenance direction (X), wherein the measuring assemblies are placed exclusively on the first and on the second walls of the box-shaped support body; wherein the first microphones and/or the second microphones are aligned and spaced by a first distance ($D_1$) and by a second distance ($D_2$), respectively, from one another; wherein the first distance ($D_1$) and the second distance ($D_2$) are a function of the wavelength of the acoustic signal (S) acquired and where:

$$d < \frac{\lambda}{2} = \frac{c}{2f} \quad [2]$$

where f is the frequency of the incident wave, c is the speed of sound and $\lambda$ is the wavelength.

2. The device according to claim 1, wherein the first plane is orthogonal to the second plane.

3. The device according to claim 1, wherein the first plane is different from, but parallel to, the second plane.

4. The device according to claim 1, wherein the first measuring assembly is provided with a plurality of first microphones arranged aligned in rows and columns and equally spaced from one another.

5. The device according to claim 1, wherein the second measuring assembly is provided with a plurality of second microphones arranged aligned in rows and columns and equally spaced from one another.

6. The device according to claim 1, wherein the first measuring assembly and the second measuring assembly lie on the same plane.

7. The device according to claim 1, further including a third measuring assembly provided with at least one microphone which lies on a third plane and is configured for the detection of a third acoustic signal generated by the source along a third provenance direction different from the first and second provenance directions (X, Y).

8. The device according to claim 1, further including a conditioning circuit for the first acoustic signal ($S_X$) and the second acoustic signal ($S_Y$); and an anti-aliasing filter for the first acoustic signal ($S_X$) and the second acoustic signal ($S_Y$).

* * * * *